United States Patent [19]
Anderson

[11] 3,981,472
[45] Sept. 21, 1976

[54] CUSHION CLAMP FOR SPRING SHANKS OF EARTH WORKING TOOLS

[75] Inventor: Robert D. Anderson, Murdock, Minn.

[73] Assignee: TCI, Inc., Benson, Minn.

[22] Filed: Jan. 24, 1975

[21] Appl. No.: 543,816

[52] U.S. Cl. .............................. 248/358 R; 248/15; 172/705
[51] Int. Cl.² ......................................... F16F 15/04
[58] Field of Search ..... 248/358 R, 358 A, 358 AA, 248/15, 18, 20; 172/705, 707, 747

[56] References Cited
UNITED STATES PATENTS

| | | | |
|---|---|---|---|
| 3,127,728 | 4/1964 | Gehman | 172/705 |
| 3,414,252 | 12/1968 | Fragle et al. | 172/711 |
| 3,432,127 | 3/1969 | Philipp | 248/15 |
| 3,469,637 | 9/1969 | Kennedy | 172/707 |
| 3,478,160 | 11/1969 | Reed | 248/358 R |
| 3,825,073 | 7/1974 | Gardner et al. | 172/705 |

FOREIGN PATENTS OR APPLICATIONS

| | | | |
|---|---|---|---|
| 249,694 | 2/1964 | Australia | |
| 668,783 | 3/1952 | United Kingdom | 172/705 |

*Primary Examiner*—Robert A. Hafer
*Attorney, Agent, or Firm*—Dugger, Johnson & Westman

[57] ABSTRACT

A clamping assembly for mounting the spring shanks of earth working tools to support frames, and in particular for the spring type shanks used for anhydrous ammonia applicators, which mounts the shank in a cushion support to permit resilient movement of the shank under load to thereby reduce stresses caused by shock loads.

8 Claims, 7 Drawing Figures

CUSHION CLAMP FOR SPRING SHANKS OF EARTH WORKING TOOLS

BACKGROUND OF THE INVENTION

1. Field of the Invention

The present invention relates to clamps for holding shanks for mounting earth working tools, such as those used with anhydrous ammonia applicators.

2. Prior Art

In the prior art, generally the spring shanks used with anhydrous ammonia applicators are clamped rigidly to a tool bar or other support frame. The rigid mounting can cause high shock loads in the shank adjacent the mounting clamps, and the shock loads increase stresses in the spring shank so that the shank life is reduced substantially.

SUMMARY OF THE INVENTION

The present invention relates to a clamping assembly for a spring shank which uses a shock absorbing mounting enclosure for the spring shank so that the shanks will be supported under a resilient load. The clamping assembly is made so that it can clamp onto its conventional tool bar. An elastomeric or rubber mounting housing is used and comprises a torsion type bushing for holding an upright prong or finger of the shank, and a shock absorbing block that exerts a force on another section of the shank to resiliently hold the shank in a stopped position for working.

In a modified form, the clamp assembly has means to permit the shank to move from side to side up to 15 degrees from a center line position to clear obstructions if desired.

The clamping assembly can be used for a wide variety of shanks for earth working tools, and the resilient mounting will reduce the shock loads on the shank to increase the shank life substantially.

DESCRIPTION OF THE PREFERRED EMBODIMENTS

Figure 1:
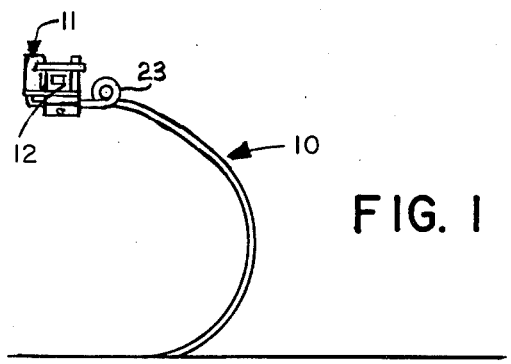
FIG. 1 is a reduced side elevational view of a typical spring shank mounted on a tool bar with a clamp assembly made according to the present invention.

In FIG. 1, a typical installation shows an earth working tool spring shank illustrated generally at 10 mounted with a clamp assembly 11 onto a square tool bar 12. Tool bars (square tubular mounting bars) are quite commonly known, and usually are elongated transverse extending bars that are mounted onto wheels through suitable frames for drawing the tool bar over the ground. The square bars which provide supports for clamping spring shanks or earth working tools thereto.

Figure 2:
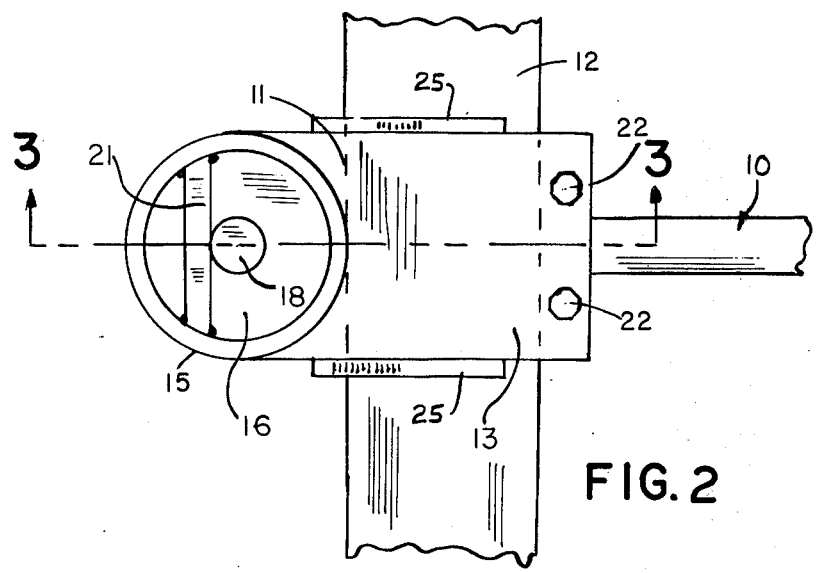
FIG. 2 is a top plan view of the clamp assembly of FIG. 1.
Figure 3:
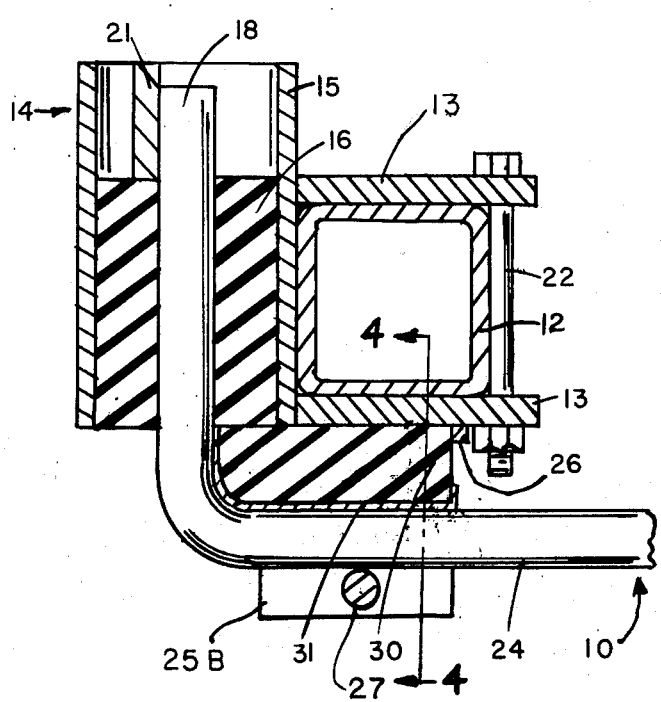
FIG. 3 is a sectional view taken substantially on line 3—3 in FIG. 2.
Figure 4:
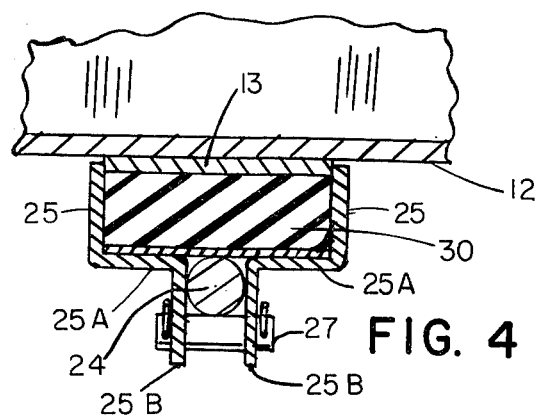
FIG. 4 is a sectional view taken as on line 4—4 in FIG. 3.

Referring specifically to FIGS. 2–4, for a more detailed showing of the clamp assembly 11, it can be seen that the clamp assembly includes a pair of plates 13, 13 that form a support base. The plates fit respectively over the upper and lower surfaces of the tool bar 12. The plates 13 have a rubber shock mounting assembly 14 mounted thereon. The shock mounting assembly 14 includes an outer cylindrical tube 15 welded to plates 13, 13 and a rubber sleeve 16 pressed into the interior of the tube 15 and thus fixed therein. The sleeve 16 has a center opening which receives an upright support prong or finger 18 of spring shank 10.

The upright prong or finger 18 passes downwardly from the sleeve 16. A stop plate 21 is welded to the interior of tube 15, as can perhaps best be seen in FIGS. 2 and 3, and fits against the top of sleeve 16 to provide a metal stop for the upper portion of finger 18 which protrudes from the sleeve 16. The top and bottom plates 13 are clamped onto the tool bar with a pair of bolts 22 which extend between the top and bottom plates and are positioned on the side of the tool bar opposite from the cushion sleeve assembly 14.

As can be seen, the spring shank 10 includes a coiled section 23 forming a spring coil for the lower portion of the shank, and also has a horizontal section 24 that joins the upright finger or prong 18. The horizontal section 24 is positioned so that it is underneath the lower plate 13, and passes underneath the tool bar 12. The lower plate 13 has a pair of depending side brackets 25, 25 welded on opposite sides thereof and extending downwardly. The brackets have shoulder portions 25A that extend toward each other and vertical portions 25B that are spaced to snugly receive the horizontal section 24 of the shank. A flange 26 is welded to and depends from and the lower plate 13 extends between the brackets 25, 25. A pin 27 fits through provided openings in bracket portions 25B and extends therebetween. The horizontal shank section 24 passes above the pin 27 and is retained thereby. The pin 27 may be retained by use of hairpin clips.

A rubber or elastomeric bumper block 30 is positioned on the bottom side of lower plate 13 above the shoulder portion 25A and ahead of flange 26. The block 30 is of size so that it extends forwardly to fit under tube 15 and is close to the upright finger 18. The block exerts a resilient force downwardly against the upper edge or side of the horizontal section 24 of the spring shank. The pin 27 forms a downward stop for the shank to hold it in position.

A thin metal wear plate 31 is positioned on the underside of block 30 to provide a wear surface for the horizontal section of the shank. The wear plate curves over the forward portion of the block so the junction between the upright finger 18 and the horizontal section 27 also bears on the plate.

During operation, it can be seen that loads on the lower portion of the spring shank will cause the upper portions to flex in the coil 23, and the horizontal section 24 will tend to raise. The load on the horizontal section will be taken by the elastomeric bumper 30 at the same time that the upright finger 18 causes compression at the lower part of the sleeve 16 adjacent the tool bar 12. The plate 21 prevents substantial movement of the upper part of finger 18 in forwardly direction. These elastomeric members cushion shock loads on the shank. In this form of the invention, side to side movement of the horizontal portion 24 is restrained by the bracket portions 25B. When the lower portion of the shank strikes an obstruction however, it can move sideways a substantial amount even with a small amount of compression of sleeve 16 and block 30 because of the distance of the lower portion of the shank from the clamp assembly. The finger 18 will move sideways in sleeve 16 by compressing the sleeve if the horizontal section 24 is carrying a torsion load.

Of course the clamp assemblies can be adjusted along the tool bar 12 to any desired position, and can be replaced quite easily.

The elastomeric sleeve 16 and bumper 30 are relatively high durometer elastomer for adequate resistance, and can be made harder or softer as desired. Many suitable elastomeric materials are available for this purpose. A durometer of in the range of 90 Shore A has been found useful for sleeve 16 and the block 30 may be softer, for example 60–70 Shore A durometer.

Figure 5:
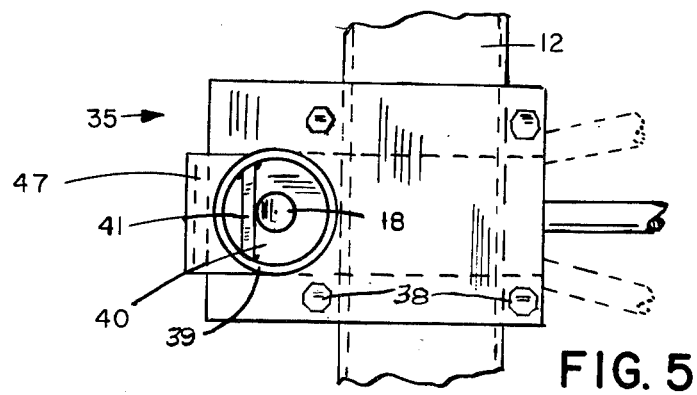
FIG. 5 is a top view of a modified form of the invention.
Figure 6:
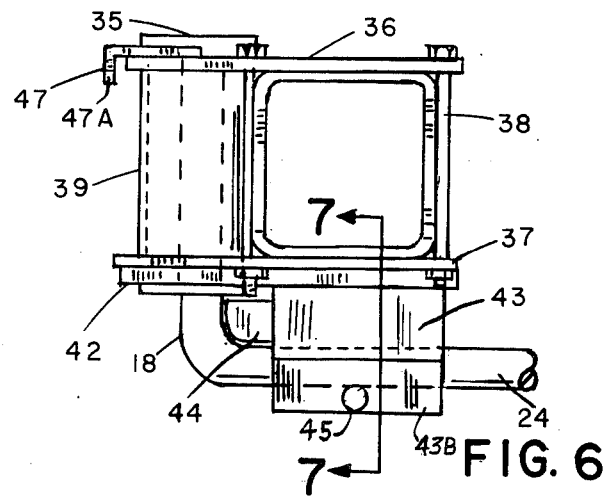
FIG. 6 is a side view of the device of FIG. 5.
Figure 7:
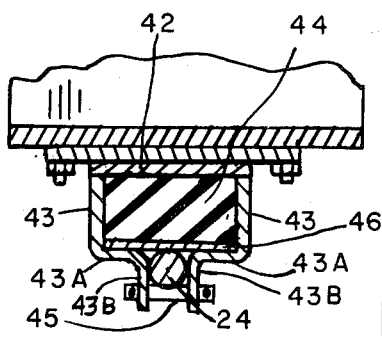
FIG. 7 is a sectional view taken as on line 7—7 in FIG. 6.

A modified form of the invention is shown in FIGS. 5, 6 and 7, which will permit the shank 10 to swing laterally, while it is still carried in the type of elastomeric mounting just described. A bracket is made to provide a limited amount of lateral travel for the rear and lower portions of the shank. In this form of the invention, the tool bar 12 carries the clamp assembly indicated generally at 35, and this clamp assembly has a top plate 36 and a bottom plate 37 that are merely clamped to the tool bar 12 with four bolts indicated at 38. These brackets are each provided with an opening at the forward ends thereof of size to pivotally receive a tube 39, that corresponds in construction to tube 15. The tube 39 has an elastomeric sleeve 40 positioned therein to receive an upright finger 18 of a shank 10. A stop plate 41 is provided on the interior of tube 39 in the same manner as the plate 21 is provided. In this form of the invention, the tube 39 has a wear plate 42 welded thereto adjacent the bottom thereof, and positioned against the lower surface of the plate 37 for the bracket. The tube 39 is pivotally mounted in the brackets 36 and 37, and thus the plate 42 is free to slide against the bottom surface of the plate 37 about the axis of the center of the tube 39, which is also the axis of the upright finger 18.

The plate 42 carries side brackets 43 that house a rubber bumper 44 in the same manner as the brackets 25 do. The brackets 43 have shoulder portions 43A, that extend inwardly toward the center of the brackets, and have downwardly depending vertical portions 43B that receive the shank horizontal portion 24 in the same manner as previously described. However, it should be noted that the brackets 43 will swing with the plate 42 about the axis of the tube 39. A resilient bumper block 44 is mounted above the shoulder portions 43A, and under the plate 42, and as shown is retained between the main portions of the bracket 43, 43 and extends forwardly as the previous bumper 30 did. A small stop member can be welded to the plate 42 at the rear thereof to hold the rubber bumper in position.

A pin 45 passes through the vertical portions 43B of the brackets 43, and the pin holds the horizontal section 24 of the shank in position between the brackets 43, and up against the block 44. The pin 45 also may be retained in place by hairpin clips or other fasteners. A metal wear plate 46 also may be provided on the lower surface of the block 44.

In addition, a stop bracket 47 is welded to the upper portions of the tube 39 above the plate 36, and the stop bracket 47 has a depending lip 47A that extends over the forward edge of the plate 36. The opposite sides of the lip 47A will engage the front edge of the plate 36 to limit the amount of pivoting of the tube 39, and thus of the shank assembly to the range desired. As shown in FIG. 5, the shank can then pivot until the respective edge of the depending flange 47A strikes the front edge of the plate 36. In practice, the range goes up to about 15° of pivoting. The stop bracket 47 is welded in place after plates 36 and 37 have been slipped onto tube 39. The stop bracket 47 also therefore supports the tube 39 from downward movement by bearing on the upper surface of plate 36.

The same advantages of the cushion mounting of the finger 18 and the horizontal portion 24 of the shank is achieved with this form of the invention, but in addition the shank can pivot to clear large laterally extending obstructions by having a pivotal mounting to the tube that mounts the finger 18.

The range of hardness of the elastomeric or rubber materials for the sleeve 40 and the bumper 44 can be the same as for the previous form of the invention.

In both forms of the invention the shank can be easily replaced by removing the clips retaining pin 27 or pin 45 and removing the respective pin. The shank can thus be dropped down for removal and easily replaced by reversing the process.

The blocks that support the horizontal sections 24 of the shanks extend about one-third of the length of the section as shown, but this distance may be modified if desired.

What is claimed is:

1. A clamp assembly for mounting a spring shank onto a support frame member, including a main support means, means to fix the main support means to a support frame member, a spring shank having an attachment portion comprising a first finger bent integral with said shank and at substantially right angles to an adjacent portion of the shank, said adjacent portion being positioned generally horizontal during use, and means connected between said first finger and said main support means comprising a resilient elastomeric sleeve and a housing holding said sleeve, and a separate elastomeric block mounted on said main support means and positioned between said main support means and the adjacent generally horizontal portion of said shank, said finger being mounted in said sleeve and transferring loads on said spring shank to said elastomeric sleeve, and through said housing to said main support means and said adjacent generally horizontal portion bearing against said elastomeric block during use of said spring shank to transfer loads from the horizontal portion of the spring shank to the main support means.

2. The combination of claim 1 wherein said finger extends generally uprightly, said main support means includeing means to permit pivotal movement of said upright finger about its axis, and stop means on said main support means to limit the amount said finger can pivot about its axis from a centered position.

3. A clamp assembly for mounting a spring shank onto a support frame member, which spring shank includes a substantially horizontal portion adjacent the attachment end thereof and a substantially perpendicular upright finger bent upwardly from said horizontal portion, said clamp assembly including a support member comprising a housing, an elastomeric sleeve mounted in said housing, said sleeve having an opening therethrough to receive and mount a finger of a spring shank in the clamp assembly, and a separate elastomeric block mounted on a portion of said support member and positioned to overlie a horizontal shank portion of a spring shank held in the clamp assembly, said elastomeric sleeve and elastomeric block thereby supporting loads from two perpendicular portions of a shank held in the clamp assembly to resiliently absorb non-torsion loads in at least two mutually perpendicular directions of loading and comprising the means for transferring loads from a spring shank held in the clamp assembly to said support member when a spring shank held in the clamp assembly is under a load.

4. The combination of claim 3 wherein said finger of a spring shank held in said clamp assembly lies in the plane of such a shank and includes an end portion extending axially out of said elastomeric sleeve, and stop means mounted on said housing on the exterior of said elastomeric sleeve, said stop means being positioned to engage the end portion of a finger of a spring shank held by the clamp assembly extending from the sleeve to limit movement of the end portion in at least one direction.

5. The combination as specified in claim 4 wherein said horizontal section of a spring shank held in a clamp assembly is positioned below the support member, and said block of elastomeric material is positioned to bear against a horizontal section of a spring shank held by the clamp assembly when the spring shank is under load.

6. The combination as specified in claim 3 wherein said support member includes first and second sections, said first section mounting said elastomeric sleeve, and means to pivotally mount said first section to said second section comprising means to mount said housing about the axis of said finger to said second section.

7. The combination of claim 6 and a wear plate positioned between said elastomeric block and a horizontal shank portion of a spring shank held in the clamp assembly and contacting said horizontal shank portion.

8. The combination of claim 6 and means on said housing defining stop means to limit pivotal movement of a spring shank held in the clamp assembly about the central axis of its upright finger.

* * * * *